United States Patent [19]
Gaunt

[11] 3,834,058
[45] Sept. 10, 1974

[54] FISHING LURE

[76] Inventor: Jack R. Gaunt, 1150 Tattersall Dr., Victoria, British Columbia, Canada

[22] Filed: May 3, 1973

[21] Appl. No.: 356,780

[52] U.S. Cl.............. 43/42.32, 43/42.49, 43/42.51
[51] Int. Cl........................................... A01k 85/00
[58] Field of Search............ 43/42.32, 42.33, 42.36, 43/42.47, 42.48, 42.45, 42.5, 42.46, 42.49, 42.51

[56] References Cited
UNITED STATES PATENTS

| | | | |
|---|---|---|---|
| 2,791,056 | 5/1957 | Davis | 43/42.36 X |
| 2,854,780 | 10/1958 | Dege | 43/42.32 X |
| 2,861,381 | 11/1958 | Snyder | 43/42.5 X |
| 2,866,292 | 12/1958 | Busch | 43/42.48 |
| 2,982,048 | 5/1961 | McGarry et al. | 43/42.5 X |
| 3,230,658 | 1/1966 | Wvotila | 43/42.5 X |
| 3,656,253 | 4/1972 | Gaunt | 43/42.33 |

Primary Examiner—Hugh R. Chamblee
Attorney, Agent, or Firm—Seed, Berry, Vernon & Baynham

[57] ABSTRACT

A fishing lure having a relatively flat elongated main body portion, tapered from a broad leading end to a substantially pointed trailing end. The body of the lure includes a scooped nose and a slight twist along its longitudinal axis. The lure is secured to a fishing line by means of a plurality of holes through which the leader is woven from a location on top of the lure adjacent the nose, forward of the scoop, downwardly and rearwardly, the leader then passes upwardly, remains on top of the lure to a position forward of the tail whereat it again passes through the body and terminates in a fish hook. The attachment, or hole through which the leader passes at the nose of the lure is placed slightly on one side of a line dividing the distance between the sides of the lure.

3 Claims, 3 Drawing Figures

FISHING LURE

BACKGROUND OF THE INVENTION

The present invention relates to trolling spoons in general and in particular to a spoon which has superior action. The lure looks "alive" in the water as it swims, vibrates, darts, dives and even occasionally goes around in a circle. In addition to the characteristics described hereinabove which give the lure the appearance of wounded fish, very attractive to larger fish, it also presents very little drag upon the rod of the user.

Prior art man made lures have primarily been of two categories (1), the flat trolling spoon usually made of metal having a contour causing the spoon to have some action, described in the U.S. Pat. to Reekers, No. 1,471,280, granted Oct. 16, 1923, and (2) a plug which is a carved or shaped wooden or plastic body having a rudder or nose configuration causing the body portion, which generally has the shape of a fish, to move in an agitated fashion.

Another form of fishing lure which is in wide use but has not been particularly described hereinabove is that of live bait, either a herring secured directly to a hook or used in a keeper whereby the fish itself serves to camouflage the hook and yet give the appearance of an unfettered feast. The man made lures are an attempt to simulate the feeder fish and is a lure which is durable and permanent.

The above noted prior art is well known to the present inventor and it is an object of the present invention to provide a man made lure which provides more realistic characteristics of wounded feeder fish than have heretofore been possible.

In accordance with this object and as a feature of the present invention there is provided a fishing lure which has a unique configuration. The hook and line attachment to the lure is novel and imparts unusual characteristics to the lure which are attractive to game fish.

Another object of the present invention is to provide a fishing lure which is attractive to game fish, unique in its path of travel as it is pulled through the water, and further is inexpensive to manufacture and very durable. The lure will not be damaged or misshapen by the usual wear and tear received in the tacklebox or the like.

It is still another object of the present invention to provide a fishing lure which receives its feeder fish imitating characteristics because of its unique shape and attachment means. The lure may be reproduced in a large variety of sizes and in a large variety of colors and/or decorations without affecting the unique swimming characteristics of the lure.

DETAILED DESCRIPTION OF THE DRAWINGS

Figure 1:
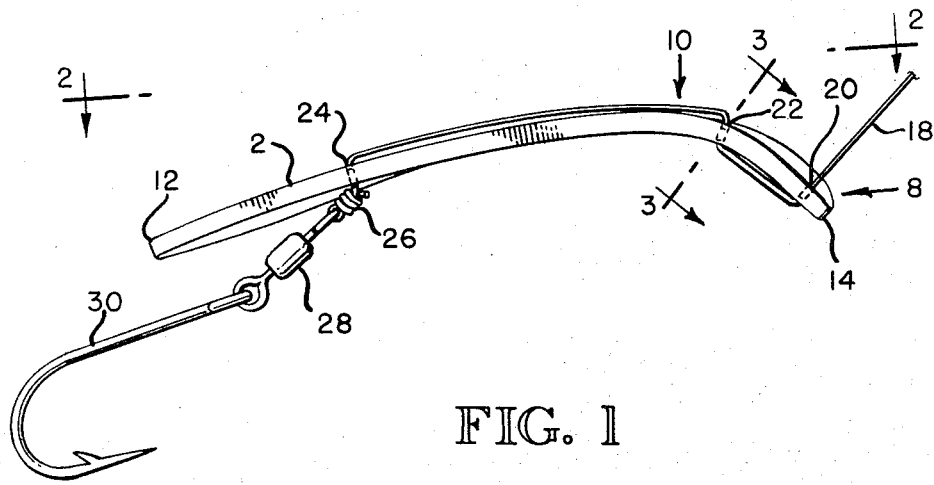
FIG. 1 is an elevational view of the present lure showing its general profile as well as the means of securement to the leader which is in turn secured to the fishing line.

As can be seen in the Figures, the fishing lure comprises a main body portion 2 which is generally wider than it is thick and has a pair of essentially symmetrical or identical sides 4,6. One end of the lure, the leading end, is shaped into a blunt front or nose portion 8. The lure tapers outwardly to a shoulder portion 10 and then tapers to a pointed tail portion 12.

The entire lure, as seen in profile, is of a curved configuration such that the top is convex and the bottom is concave. The leading portion 8 of the lure is curved downwardly with a shorter radius of curvature beginning at about the shoulder portion 10. The entire shoulder portion is twisted substantially along the longitudinal axis such that the corner 14 of the nose portion is lower than corner 16 when the lure is positioned such that the width is disposed generally horizontally.

Figure 2:
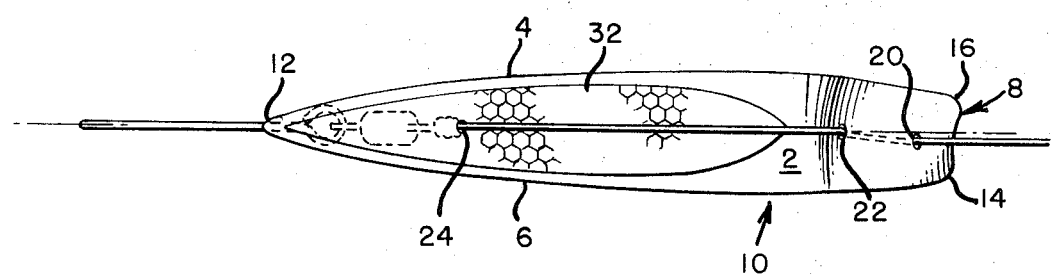
FIG. 2 is a plan view of the lure of FIG. 1 taken along lines 2—2 of FIG. 1
Figure 3:
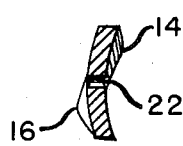
FIG. 3 is a sectional view of the lure of FIG. 1 taken along lines 3—3 of FIG. 1.

The lure is secured to the fishing line 18, in the preferred embodiment by means of three holes 20, 22 and 24. Holes 22–24 are located approximately along the longitudinal axis of the lure; i.e., midway betwen the edges, as best seen in FIG. 2. Hole 20, which is at the nose portion 8, is slightly offset to counteract the forces generated by the twist in the leading portion 8 of the lure. The relative location of hole 20 can be seen by comparing the position with respect to center line. The fishing line 18 or leader terminates in a knot 26 which is adapted to abut the lower portion of the main body portion after the leader 18 has passed through hole 24. There are secured to the leader 18 a swivel 28 and hook 30.

As seen in FIG. 2 the lure may be given varying characteristics or appearances by the addition of a reflective tape 32 such as metalized plastic tape of Mylar polyester or the like which may be added to one or both sides of the lure as desired. It is to be understood that the main body portion of the lure will be made of a molded plastic such as butyrate or the like and colors may be imparted directly to the plastic as desired. It is further within the contemplation of the present invention that the surface may also be decorated by paint or the like.

In operation, as noted above, the lure swims, vibrates, darts, dives and goes around in an occasional circle. The scoop nose portion 8, which is placed at an angle related to the degree of twist of the lure gives the lure a squiggly swimming action. To obtain the wounded and erratic action of diving, darting and circling, the scoop front is utilized but is given a slight twist, as noted above, and this gives the lure a tendency to travel in a circle. The circular motion is continued during the squiggling and swimming action. The remainder of the lure also has a slight twist which tends to counteract the forces generated by hole 20 which is off-center and therefor creates a directed force. To assure that the action is not uniform but is varied through its entire path, the aft hole 24 is kept a fair distance forward of the tail such that when the lure is being towed through the water the swivel and hook rub against the tail portion and cause it to interrupt the action from time to time and change the entire performance.

Thus it can be seen that the lure as shown above and described imparts an erratic motion which looks realistic to a game fish and yet gives the appearance of a fish which is injured or otherwise not generally strong.

The embodiments of the invention in which an exclusive property or privilege is claimed are defined as follows:

1. A fishing lure which, when towed through the water, gives the appearance of a fish which is injured, comprising:

a tear-shaped elongated planar member of greater length and width than thickness having a top surface and bottom surface and having a blunt towing head end and a pointed tail end, the planar member, when viewed from the side, curving downwardly at the towing head end relative to the top surface thereof, the towing head end twisted about the longitudinal axis of the planar member such that one corner of the towing head end extends above and the other corner below a plane extending through the planar member, the twist tending to make the lure revolve in a spinning motion when towed through the water;

three openings in the lure through which a leader is woven, the first opening near the towing head end laterally offset from the longitudinal axis of the lure a small amount, tending to make the lure revolve about an axis parallel to its longitudinal axis when towed in the water, the second and third openings located along the longitudinal axis of the lure with the second opening positioned behind the first opening and along the downwardly curved portion of the towing head end, and the third opening near the tail end of the lure so that a swivel secured to a leader woven through the three openings will strike the tail end of the lure;

the opposing forces created by the laterally offset first opening and the twisted towing head end causing the lure to revolve randomly in one direction and then in the other along with wiggling motion caused by the downwardly curved towing head end when the lure is towed through the water, the lure very nearly resembling a wounded bait fish.

2. The lure of claim 1 wherein the planar member includes a sheet metallic reflector tape covering a substantial portion of the top surface of the member, the planar member colored to contrast with the reflective material.

3. The lure of claim 1 wherein a leading line extends through the first opening in the planar member from the top surface thereof, then through the second opening from the bottom surface thereof, then extends along the longitudinal axis of the lure to the third opening and down through the third opening, and wherein a swivel and hook are secured to the leader line after it passes through the third opening.

* * * * *